United States Patent [19]
Stevens, Jr.

[11] 3,741,248
[45] June 26, 1973

[54] ROTARY SELECTOR VALVE MECHANISM

[75] Inventor: Frederick F. Stevens, Jr., Fairfield, Conn.

[73] Assignee: Hoff-Stevens, Inc., Ansonia, Calif.

[22] Filed: June 25, 1971

[21] Appl. No.: 156,881

[52] U.S. Cl. .............. 137/627, 137/555, 137/607, 251/131, 251/133, 251/214, 251/257
[51] Int. Cl. ........................................... F16k 19/00
[58] Field of Search.................... 137/555, 607, 627, 137/630.2, 636.1; 251/131, 133, 134, 214, 257, 258, 260; 277/95, 109, 110, 180

[56] References Cited
UNITED STATES PATENTS

| | | | |
|---|---|---|---|
| 2,341,330 | 2/1944 | Parker | 251/257 X |
| 3,157,381 | 11/1964 | Floyd | 251/214 |
| 3,429,232 | 2/1969 | Weiss | 251/133 X |
| 3,044,495 | 7/1962 | Alfieri | 137/636.1 |
| 3,128,679 | 4/1964 | Trendle | 277/95 X |
| 2,232,597 | 2/1941 | Downey | 137/630.2 |
| 2,301,439 | 11/1942 | Moen | 137/607 X |
| 2,769,459 | 11/1956 | Birkness et al. | 251/257 X |

FOREIGN PATENTS OR APPLICATIONS

| | | | |
|---|---|---|---|
| 150,143 | 9/1920 | Great Britain | 137/627 |

Primary Examiner—Robert G. Nilson
Attorney—Roger B. McCormick, Donald K. Huber, Frederick J. Haesche et al.

[57] ABSTRACT

A rotary selector valve mechanism having a housing defining a generally cylindrical fluid chamber and including a fluid outlet port communicating with the chamber. A circumaxial series of inlet valves mounted on the housing each include an inlet port and a valve element movable between opened and closed positions and biased to closed position to prevent passage of fluid from the inlet port to the chamber. A rotary crank mechanism journalled for coaxial rotation relative to the fluid chamber is adapted for selective angular positioning relative to the valve elements to retain a selected one of the valve elements in its open position whereby a fluid flow path is provided from the inlet port associated with the one inlet valve to and through the chamber to the outlet port. Positioning of the crank mechanism is remotely controlled by a servo mechanism which includes a rotary selector switch.

4 Claims, 5 Drawing Figures

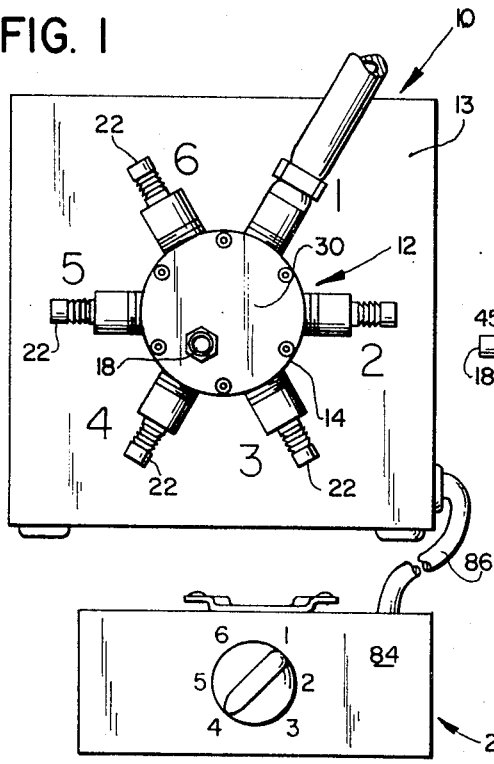
FIG. 1
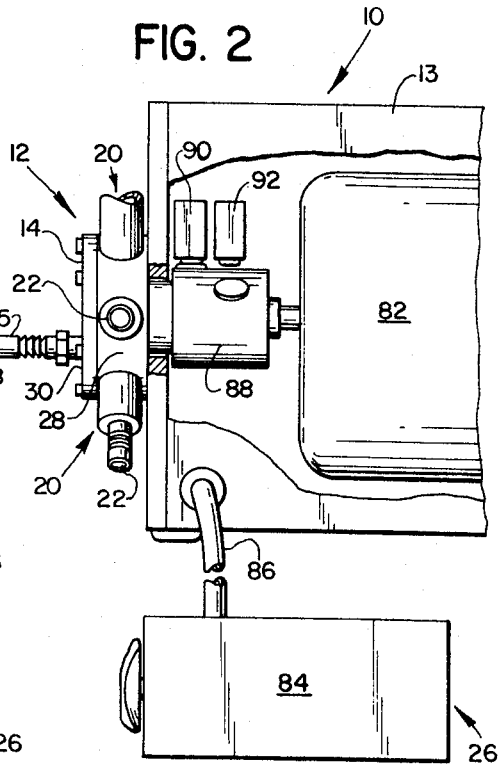
FIG. 2
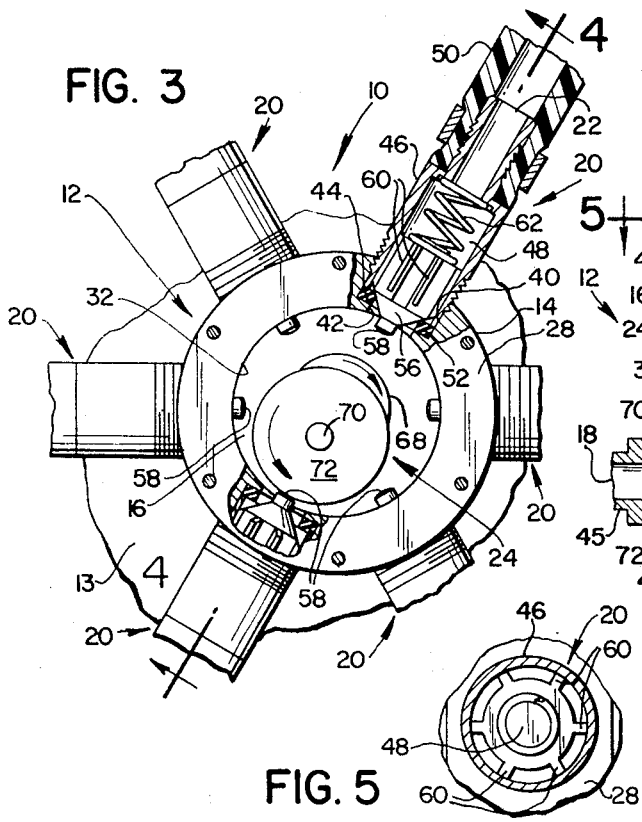
FIG. 3
FIG. 5
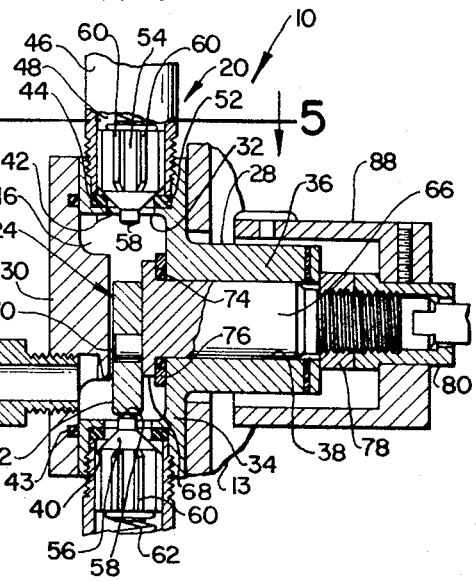
FIG. 4
*INVENTOR.*
FREDERICK F. STEVENS
BY McCormick, Paulding & Huber
ATTORNEYS 3,741,248

ROTARY SELECTOR VALVE MECHANISM

BACKGROUND OF THE INVENTION

This invention relates in general to valve mechanisms and deals more particularly with an improved rotary selector valve mechanism for a fluid distribution system or the like. The apparatus of the present invention is suitable for use in any fluid distribution system where it is desired to provide fluid connection between one fluid conduit and a selected one of a plurality of other fluid conduits. However, the apparatus of the present invention is more particularly adapted for use in a pressurized beverage distribution or draft beer system to facilitate rapid selective connection between a single dispensing faucet or spigot and any one of a plurality of remotely located tapped barrels, kegs or the like. The present apparatus offers substantial advantages even for use in a low volume beverage dispensing system where the contents of a single keg connected to the system may last for several hours. In a system of the latter type, some flow variation is usually encountered at the spigot accompanied by the discharge of pressure therefrom when the single keg connected to the system is nearly empty. Upon receiving this warning signal, the bartender will usually try to replace the nearly spent keg with a new one at the first convenient opportunity to avoid customer inconvenience and in so doing, may sacrifice any beverage remaining in the keg. In a high-volume distribution system, this problem may be avoided by connecting a plurality of kegs in series to each other and to a common distribution line connected to the dispensing faucet. While such systems avoid necessity of frequent keg changes, certain disadvantages are encountered. In such systems, for example, pressure variations often occur as the volume of liquid in the system decreases. These pressure variations are accompanied by changes in flow rate at the dispensing faucet. Despite these obvious variations in flow rate, it is difficult for one operating the faucet to ascertain when each of the kegs connected to the system is empty. Some beverage waste is often encountered in the operation of such multi-keg systems when new kegs are tapped to replace others which are not entirely empty. Accordingly, it is the general aim of the present invention to provide an improved rotary selector valve mechanism for connection to a plurality of tapped kegs in a beverage distribution system which overcomes the aforesaid disadvantages and which is advantageous for use in both high and low volume distribution systems.

SUMMARY OF THE INVENTION

In accordance with the present invention a rotary selector valve mechanism is provided which includes a housing defining a fluid chamber and including a fluid outlet port communicating with the chamber. A circumaxially arranged series of inlet valves releasably retained on the housing are readily removable therefrom for cleaning and replacement. A rotary actuating mechanism journalled for rotation relative to the chamber is adapted to be selectively angularly positioned relative to the inlet valves to operate a selected one of the valves whereby a fluid flow path is established between an inlet port associated with the one valve and the outlet port. A single sealing member received within the chamber provides fluid-tight sealing engagement between the actuating mechanism and the housing.

BRIEF DESCRIPTION OF THE DRAWING

FIG. 1 is a front elevational view of a rotary selector valve mechanism embodying the present invention.

FIG. 2 is a side elevational view of the valve mechanism of FIG. 1, a portion of the casing thereof shown broken away to reveal mechanism therein.

FIG. 3 is a somewhat enlarged fragmentary front elevational view of the valve mechanism of FIG. 1 shown partially in section and with the cover of the valve assembly housing removed therefrom.

FIG. 4 is a fragmentary sectional view taken along the line 4—4 of FIG. 3.

FIG. 5 is a somewhat enlarged sectional view taken along the line 5—5 of FIG. 4.

DETAILED DESCRIPTION OF THE PREFERRED EMBODIMENT

Turning now to the drawing, the present invention is illustrated with reference to a rotary selector valve mechanism indicated generally by the reference numeral 10 and particularly adapted for use in a pressurized dispensing system for draft beer or the like to permit any one of a plurality of tapped barrels or kegs to be selectively connected to a single dispensing faucet or spigot without interference between the barrels. The mechanism 10 comprises a valve assembly indicated generally at 12 and mounted on a frame 13. The valve assembly has a housing 14 which defines a fluid chamber 16 and includes an outlet port 18 which communicates with the latter chamber. A plurality of inlet valves 20, 20 associated with the housing are arranged in a circumaxial series relative to the chamber 16. Each inlet valve 20 includes an inlet port 22 adapted to communicate with the chamber 12 and the outlet port 18 to provide a path of fluid flow through the valve assembly 12 when a valve element associated with the inlet valve is in an open position, as will be hereinafter further discussed. The ports 18 and 22 have been respectively designated as outlet and inlet ports. It should be understood, however, that this has been done to facilitate description of the apparatus, as the construction admits to the flow of fluid in either direction therethrough. A rotary actuator or crank mechanism indicated generally at 24 and supported for coaxial rotation relative to the inlet valves 20,20 operates the latter valves in sequence and may be selectively positioned relative to any one of the inlet valves to retain the selected valve in its open position. A servo mechanism indicated generally at 26 includes means for remotely positioning the crank mechanism 24 to selectively operate the valves 20,20.

Considering now the valve assembly 12 in further detail and referring particularly to FIGS. 3 and 4, the housing 14 is generally cylindrical and comprises a base 28 and a cover 30. A generally cylindrical forwardly opening recess 32 formed in the base cooperates with the cover 30 to define the cylindrical fluid chamber 16. The base 28 also includes a generally radially disposed rear wall 34 and a cylindrical central portion 36 of reduced diameter which projects rearwardly from the wall 34. A cylindrical bore 38 extends coaxially through the rear wall and the central portion 35. A circumaxial series of radially outwardly opening recesses 40,40 in the peripheral surface of the base 28 receive the inlet valves 20, 20. Each recess 40 has a generally cylindrical passageway 42 of somewhat smaller diameter at its inner end which communicates with the recess 40 and the fluid chamber 16. A generally radially outwardly facing annular bearing surface 44 surrounds each opening 42. A rearwardly opening annular recess formed in the cover 30 contains an annular seal member 43 which engages the frontal surface of the base 28 when the cover 30 is bolted in assembly therewith to provide a fluid-tight seal therebetween. The outlet port 18 is defined by a hose fitting 45 threaded into an opening in the cover 30.

The number of inlet valves 20, 20 may vary, however, the illustrated valve mechanism 10 includes six inlet valves designated by the numerals 1-6 which appear on the frame 13 in FIG. 1 and is adapted for connection to six tapped kegs. Preferably, and as shown, each inlet valve 20 is releasably retained in assembly with the housing 14 and readily removable therefrom for cleaning or replacement. If the valve mechanism 10 is to be used with less than six kegs one or more of the inlet valves may be removed from the housing and a suitable plug or plugs may be substituted therefor or, if desired one or more of the inlet ports 22, 22 may be plugged as necessary. A typical inlet valve 20 shown in vertical section in FIG. 3 includes a tubular valve casing 46 which defines a valve chamber 48. The casing 46 has an integral tube fitting at its outer end for coupling engagement with a flexible hose, such as indicated at 50 (FIG. 3) and is threaded at its inner end for connection with the housing within an associated recess 40. An annular insert or valve seat 52 rests on the bearing surface 42 and is retained in the recess 40 by the casing 46, substantially as shown. A valve element 54 received within the valve chamber 48 has a generally conical inwardly diverging seating surface 56 at the inner end thereof for fluid-tight sealing engagement with the valve seat 52. A rounded nose piece 58 at the inner end of the valve element 54 projects in a radial direction into the chamber 16 when the valve element 54 is in a closed position or in seating engagement with the valve seat 52. Elongated integral ribs 60, 60 formed on the body of the valve 54 guide it for sliding movement in the valve chamber 48. Interstices between the body of the valve element 54, the ribs, 60, 60 and the wall of the chamber 48 provide fluid passageways to permit fluid to flow between the inlet port 22 and the opening 42, which communicates with the chamber 16 when the valve element 54 is in its open position. A compression spring 62, acting between the valve element 54 and the casing 46 biases the valve element 54 radially inwardly toward its closed position in which position it is in tight sealing engagement with the valve seat 52.

The crank mechanism 24 includes a generally cylindrical crankshaft 66 journaled in the bore 38. The crankshaft has an annular flange 68 formed on the inner end thereof and an eccentric crankpin which projects from the inner end and has a roller or cam 72 journaled thereon for rolling engagement with the inner ends 58, 58 of the valve elements 54, 54 which are disposed in the path of the cam 72. The outer end of the crankshaft 66 is exposed externally of the housing 14 and is externally threaded. An annular seal or O-ring 74 preferably made from elastomeric material surrounds the inner end of the crankshaft 66 between the wall 34 and the annular flange 68. Another rigid annular member 76 surrounds the O-ring 74 between the wall 34 and the flange 68 as shown in FIG. 4. The member 76 has a thickness measured in an axial direction which is less than the thickness or cross-sectional diameter of the elastomeric O-ring 74 to prevent application of excessive force to the O-ring which might cause it to be displaced or extruded from its normal sealing position. A bearing nut 78 threaded onto the outer end of the crankshaft 66 bears against a sealing washer and a seal member associated with the central portion 36 to retain the crankshaft in fluid-tight sealed relation with O-ring 74. A lock nut 80 is threaded onto the outer end of the crankshaft to lock the bearing nut 78 in a desired position of adjustment.

Any suitable arrangement may be provided for selectively positioning the crank mechanism 24 and, if desired, the latter mechanism may be arranged for manual positioning, but preferably, and as shown the servo mechanism 26 is provided for this purpose to facilitate remote control. As shown the servo mechanism 26 includes an electrically operated servomotor 82 of gear head type mounted on the frame 13 and coupled to the crankshaft 66. The servomotor 82 operates in response to signals received from a rotary selector switch 84 which has six switching positions respectively corresponding to six positions of the crank mechanism 24. The switch 84 is electrically connected to the servomotor 82 by a line 86 and may be remotely located with respect thereto. A cam cylinder 88 secured to the lock nut 78 by a set screw as shown in FIG. 4 cooperates with microswitches 90 and 92 (FIG. 1) associated with an electrical circuit (not shown) to stop the servomotor 82 and to reset the circuit in a manner well known in the art, each time the selector switch 84 is moved to another of its six positions. Referring to FIG. 1, it will be noted that the selector switch 84 is positioned to operate inlet valve number "4" and referring to FIG. 3, it will be noted that inlet valve "4," which appears at a 7 o'clock position, is biased to its open position by engagement with the cam 72. Thus a fluid flow path is established between the inlet port 22 associated with inlet valve "4" and the outlet port 18. When the selector switch 84 is moved to position "5" the cam 72 advances in rolling engagement with nose 58 associated with inlet valve "5" and comes to rest thereon to retain the latter inlet valve in its open position, all of the other inlet valves being in closed position.

As previously noted the various inlet valves 20, 20 are releasably retained in assembly with the housing 14 and may be removed therefrom for cleaning or replacement. However, when the valves are functioning properly it is recommended that the device be cleaned by flushing a suitable cleaning fluid therethrough while the valves are sequentially operated. This procedure eliminates the need for removing the inlet valves and thereby avoids possible risk of damage to properly functioning valves

I claim:

1. A rotary selector valve mechanism comprising a housing having a base and cover releasably secured to said base, said base partially defining a generally cylindrical axially forwardly opening fluid chamber having a generally radially disposed rear wall, said cover defining the front wall of said chamber and having a single fluid outlet port opening therethrough communicating with said chamber, said base having a circumaxial series of radially outwardly opening recesses formed therein each of said recesses having a radially outwardly facing bearing surface near the inner end thereof, a plurality of annular valve seat inserts, each of said inserts received in an associated one of said recesses in seating engagement with the bearing surface thereof, a plurality of inlet valves equal in number to said recesses, each of said inlet valves having a tubular casing defining a generally cylindrical valve chamber and having an integral tube fitting at the outer end thereof communicating with valve chambers for coupling engagement with a flexible hose, said casing having the inner end thereof threadably connected to said housing in an associated one of said recesses and engaging and retaining an associated one of said inserts, each of said inlet valves having a valve element received in said valve casing thereof for sliding movement axially of said casing between open and closed positions, said valve element having a conically inwardly diverging seating surface at the inner end thereof for sealing engagement with an associated one of said inserts when said valve element is in said closed position and a cam surface on the inner end thereof disposed in said fluid chamber when said valve element is in said closed position, each of said inlet valves having a compression spring received within the casing thereof and acting between the outer end of said casing and an associated valve element therein for biasing said valve element toward its closed position, a cylindrical crankshaft coaxially journalled in said base and extending outwardly through said rear wall, said crankshaft having a generally radially disposed annular flange formed on the inner end thereof and an eccentric crankpin which projects from said inner end, a roller cam journalled for rotation on said crankpin for sequentially engaging the cam surfaces on each of the valve elements and for biasing a selected one of said valve elements to and retaining it in said open position when said crankshaft is rotated to a selected angular position relative to the housing, an annular elastomeric seal member in surrounding engagement with said crankshaft between said annular flange and said rear wall, a rigid annular seal member surrounding said elastomeric seal member between said annular flange and said rear wall, said elastomeric seal member before assembly with said crankshaft having an axial thickness greater than the axial thickness of said rigid member, a servomotor drivingly connected to said crankshaft for rotating said crankshaft, and a rotary selector switch for controlling the operation of said servomotor.

2. A rotary selector valve mechanism as set forth in claim 1 wherein said elastomeric seal member comprises an O-ring having a circular cross section.

3. A rotary selector valve mechanism as set forth in claim 1 wherein each of said valve elements includes a body having a circumaxially spaced series of axially elongated integral ribs thereon for slidable engagement with the wall of an associated valve chamber, interstices between said body, said ribs and said associated valve chamber wall defining fluid passageways.

4. A rotary selector valve as set forth in claim 1 including a bearing nut threaded onto the outer end of said crankshaft and bearing against said base for maintaining said elastomeric seal member in fluid-tight sealing engagement with said annular flange and said rear wall.

* * * * *